United States Patent [19]

Hasegawa

[11] Patent Number: 5,354,001

[45] Date of Patent: * Oct. 11, 1994

[54] DISPOSAL DEVICE FOR READING, STORING INFORMATION FROM, AND SHREDDING PAPER DOCUMENTS

[75] Inventor: Takanori Hasegawa, Tokyo, Japan

[73] Assignee: Riso Kagaku Corporation, Tokyo, Japan

[ * ] Notice: The portion of the term of this patent subsequent to Feb. 23, 2010 has been disclaimed.

[21] Appl. No.: 850,133

[22] Filed: Mar. 12, 1992

[30] Foreign Application Priority Data

Mar. 13, 1991 [JP] Japan .................................. 3-48456
Feb. 7, 1992 [JP] Japan .................................. 4-22324

[51] Int. Cl.$^5$ ............................................. B02C 25/00
[52] U.S. Cl. ..................................... 241/34; 241/100; 241/101.2; 241/236; 355/202
[58] Field of Search ................. 241/33, 100, 101.2, 241/236, 34; 355/133, 308, 316, 202

[56] References Cited

U.S. PATENT DOCUMENTS

| | | | |
|---|---|---|---|
| 4,134,341 | 1/1979 | Weigele et al. | 355/202 X |
| 4,561,765 | 12/1985 | Masuda | 241/236 X |
| 4,709,197 | 11/1987 | Goldhammer et al. | 241/236 X |
| 4,889,290 | 12/1989 | Kuffsky et al. | 241/100 X |
| 4,957,243 | 9/1990 | Kanagaki et al. | 241/236 X |
| 5,039,020 | 8/1991 | Leuthold et al. | 241/236 X |

*Primary Examiner*—Rinaldi I. Rada
*Assistant Examiner*—Clark F. Dexter
*Attorney, Agent, or Firm*—Dickstein, Shapiro & Morin

[57] ABSTRACT

A device for disposing paper and other information carrying media which reads information printed on each sheet of paper, and stores the read information, shreds the paper sheet from which the information has been read. Thus, the paper may be shredded or otherwise destroyed, but the information carried thereby may be retained in an electronic storage device, and reproduced if desired. Since each sheet of paper may carry information not only on one side thereof but may carry on two sides thereof, it is preferred that the device comprises two reading units so that one of them may read information from one side of the paper while the other reading unit reads information from the other side of the paper.

3 Claims, 11 Drawing Sheets

FIG. 4

```
file list 1. 92-01-10   10:00    reports         5 pages
2. 92-01-11   15:00    instructions    1 page
```

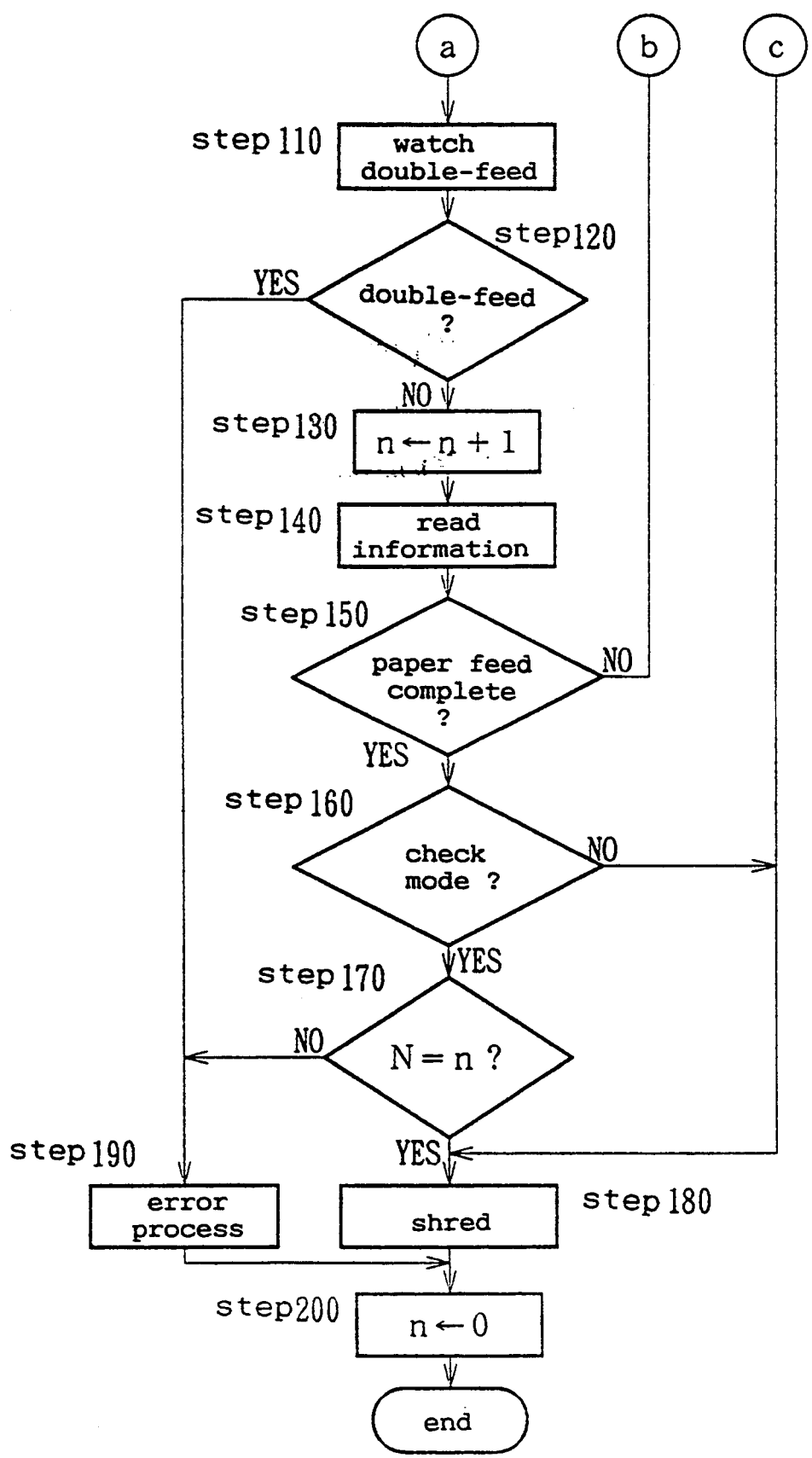

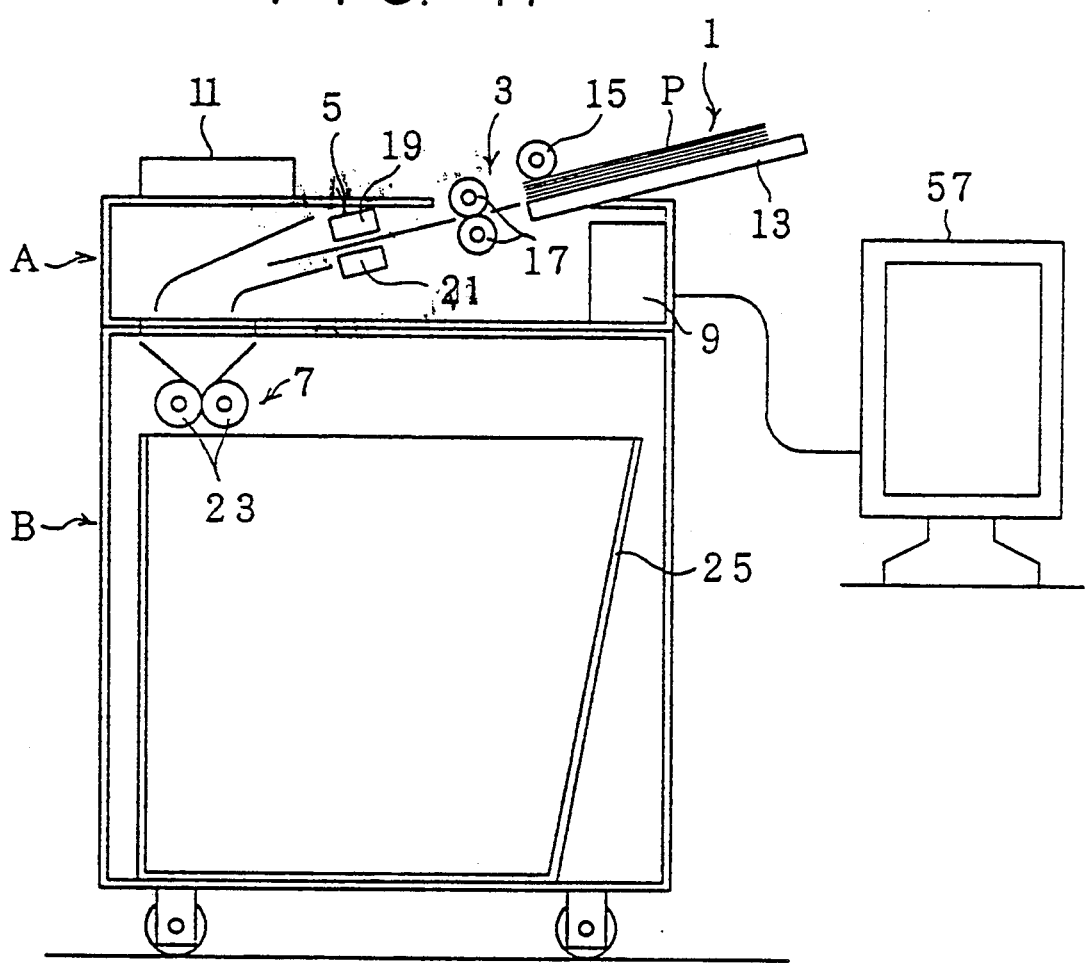

DISPOSAL DEVICE FOR READING, STORING INFORMATION FROM, AND SHREDDING PAPER DOCUMENTS

TECHNICAL FIELD

The present invention relates to a disposal device for paper and other information carrying media (which is referred to simply as "paper" hereinafter), and in particular to a disposal device for shredding paper and other information carrying media for the purpose of ensuring the security of the information.

BACKGROUND OF THE INVENTION

The devices for shredding paper documents for information security purpose are known as paper shredder, and are widely used for the disposal of paper documents containing sensitive information.

A paper shredder ensures the security of information by shredding paper documents finely enough for the information contained in the paper documents to be illegible, and recovery and reconstruction of information from shredded paper documents are practically impossible.

In the light of this possible inconvenience, it has been proposed to read the information in the paper documents with an image scanner or the like before they are shredded or otherwise destroyed so that the information read out from the paper documents may be retrieved when required.

Reports, memos and other materials that are handed out in conferences are often double-side prints or copies, and, even in the case of single-side copies or prints, remarks and other notes may be made on the back side of such copies or in the margins of the paper. Therefore, to shred such paper copies after reading all the information it contains, it would be necessary to make a copy of the back side of each sheet of paper, and such copies must be fed into a paper information disposal device along with the original paper documents.

This requires a considerable amount of work to carry out, and if the paper is shredded without due consideration to the remarks and notes made on the back side or in the margin of the paper important information may be destroyed without being read and stored in memory.

Typically, reports and materials used in conferences consist of a plurality of sheets of paper, and they are disposed at the same time. Therefore, a disposal device for paper information is desired to be equipped with paper feed means which allows each sheet of paper to be separated from a stack of paper sheets.

However, it is impossible to totally eliminate the possibility of feeding more than one sheet of paper at a time. If such an error occurs to the paper feed means, the information contained in one or more sheets of paper will be destroyed without being read and stored. This seriously impairs the reliability of the disposal device for paper information, and could cause a serious problem.

BRIEF SUMMARY OF THE INVENTION

In view of such problems of the prior art, a primary object of the present invention is to provide a disposal device for paper information which allows information to be retained if desired even after the sheets of paper carrying the information are shredded or otherwise destroyed.

A second object of the present invention is to provide a disposal device for paper information which can read and store all the information contained in the paper to be disposed of without requiring any undue efforts, and which is reliable in that no paper sheet is destroyed without its information being read and stored.

These and other objects of the present invention can be accomplished by providing a device for disposing paper and other information carrying media, comprising: means for reading information printed on each sheet of paper; information storage means for storing information read by the information reading means; and paper shredding means for shredding the paper sheet from which the information has been read by the information reading means.

Thus, the paper may be shredded or otherwise destroyed, but the information carried thereby may be retained in electronic storage means, and reproduced if desired.

Since each sheet of paper may carry information not only on one side thereof but also may on two sides thereof, it is preferred that the information reading means comprises a first information reading means for reading information from one side of each sheet of paper, and second information reading means for reading information from the other side of each sheet of paper.

To ensure the reliability of the disposal system and eliminate the possibility of destroying paper documents without reading information from each and every sheet of paper, the disposal device may further comprise means for storing paper sheets after information has been read therefrom by the information reading means; and means for feeding the paper sheets to the paper shredding means only after the process of reading information from the paper sheets by the information reading means has been satisfactorily completed.

BRIEF DESCRIPTION OF THE DRAWINGS

Now the present invention is described in the following with reference to the appended drawings, in which:

FIG. 4 is an example of a file list displayed on the display unit of the disposal system for paper documents according to the present invention;

FIG. 10 is a flow chart showing steps 110 through step 200 of the control flow of the embodiment illustrated in FIG. 8; and FIG. 11 is a view similar to FIG. 1 showing yet another embodiment of the present invention.

DETAILED DESCRIPTION OF THE PREFERRED EMBODIMENTS

Figure 1:
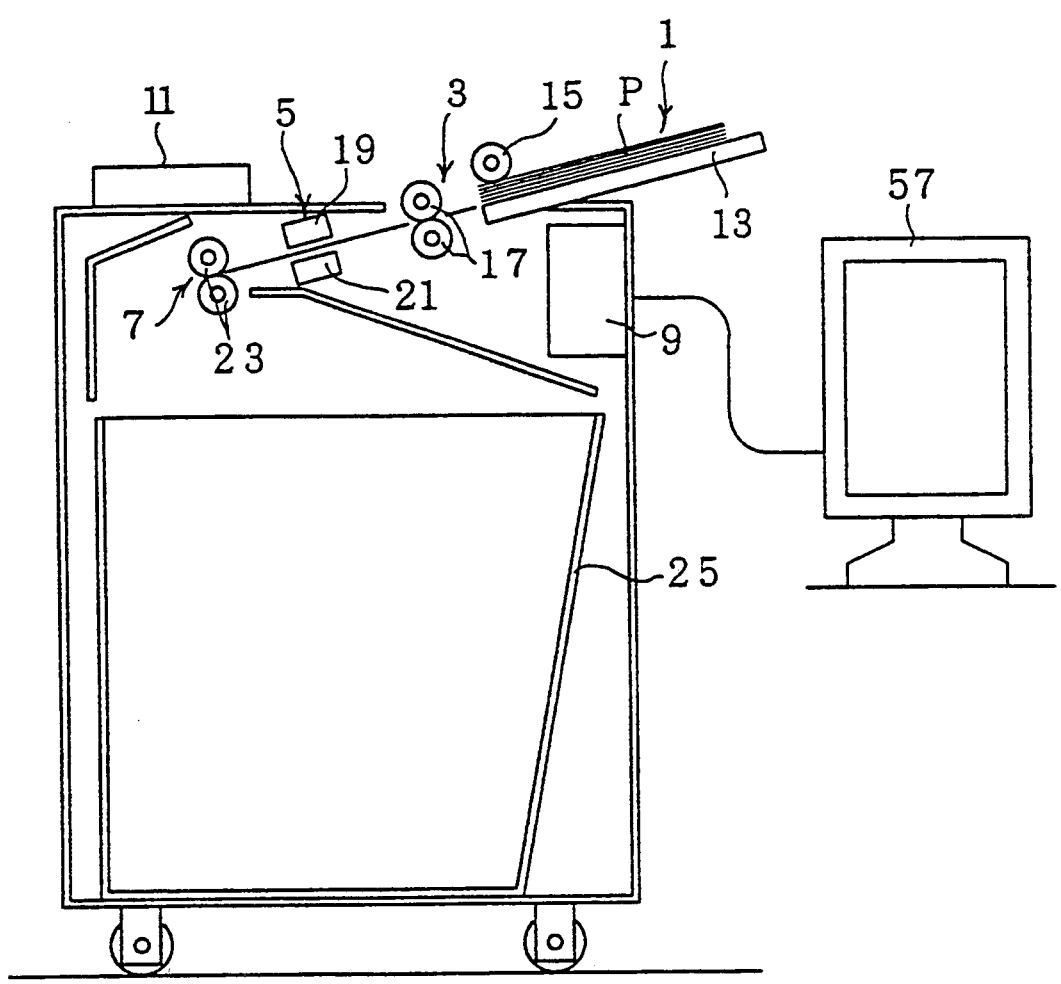
FIG. 1 is a diagram showing the overall structure of an embodiment of the disposal device for paper documents according to the present invention.

Referring to FIG. 1 showing an embodiment of the disposal device for information carrying media such as paper documents, this device comprises an automatic paper feed unit 1, a paper feed roller unit 3, an information read out unit 5, a paper shredding unit 7, an information processing unit 9, and an operation panel unit 11.

In the automatic paper feed unit 1, each sheet of paper P is separated from a stack of paper placed on a paper feed table 13 by a feed out roller 15 sheet by sheet, and is fed to the paper feed roller unit 3. The paper feed roller unit 3 comprises a pair of paper feed rollers 17 which are driven at a prescribed rotational speed, and each sheet of paper P from the automatic paper feed unit 1 is fed to the information read out unit 5 at a prescribed feed speed.

The information read out unit 5 comprises a CCD line sensor 19 for the front side serving as first information reading means, and another CCD line sensor 21 for the back side serving as second information reading means. The front side CCD line sensor 19 is fixedly placed in such a position as to scan the information printed on the front face or, in the illustrated embodiment, the upper side of the paper P fed by the paper feed roller unit 3, and the back side CCD line sensor 21 is fixedly placed in such a position as to read the information printed on the back face or, in the illustrated embodiment, the underside of the paper P fed by the paper feed roller unit 3.

The paper shredding unit 7 is positioned downstream of the information read out unit 5 with respect to the feed direction of the paper P by the paper feed roller unit 3, and receives the paper P which has been passed through the information read out unit 5. The paper shredding unit 7 is provided with a structure similar to that of a conventional paper shredder, and comprises a pair of cutter rotors 23 which are rotatively driven and shred the paper P into extremely fine strips.

Below the paper shredding unit 7 is disposed a shredded paper storage box 25 which stores the shredded pieces of paper produced by shredding the paper in the paper shredding unit 7.

Figure 2:
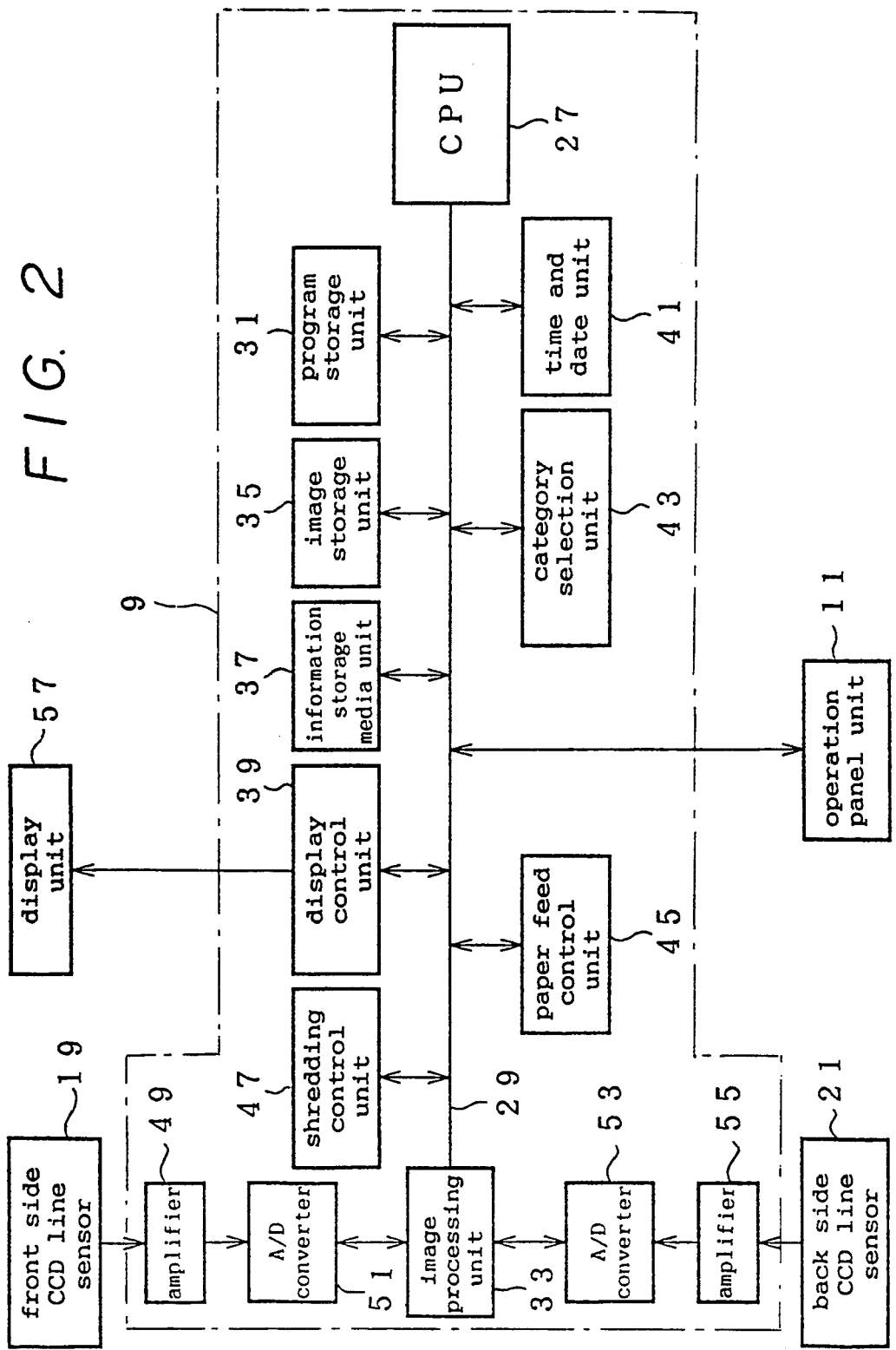
FIG. 2 is a block diagram showing an embodiment of the control system for the disposal system for paper documents according to the present invention.

Referring to FIG. 2, the information processing unit 9 is operated by a computer including a CPU 27, and comprises a program storage unit 31, an image processing unit 33, an image storage unit 35, an information storage media unit 37, a display control unit 39, a time and date unit 41, an information category data unit 43, a paper feed control unit 45 for controlling the operation of the automatic paper feed unit 1, and a shredding control unit 47 for controlling the operation of the paper shredding unit 7 which are contracted to each other via a bus line 29. Further, the information processing unit 9 electrically connects the bus line 29 to the operation panel unit 11.

The front side CCD line sensor 19 and the back side CCD line sensor 21 read The information printed on each sheet of paper P as image information, and convert it into an electric signal. The electric signal produced by the front side CCD line sensor 19 is amplified by an amplifier 49, and is converted into a digital signal by an A/D converter 51. The electric signal produced by the back side CCD line sensor 21 is amplified by an amplifier 55, and is converted into a digital signal by an A/D converter 53. These digital signals are fed into the image processing unit 33.

The image processing unit 33 carries out the processes of compensating and compressing the digital image signal from the A/D converters 51 and 53 under the command from the CPU 27, and the obtained data is stored in the image storage unit 35 for each sheet of the paper P.

The image storage unit 35 is a buffer memory for storing the image data for each sheet of paper P, and comprises a memory area for the information read out by the front side CCD line sensor 19 or the information read from the front side of the paper sheet, and another memory area for the information read out by the back side CCD line sensor 21 or the information read from the back side of the paper sheet, separately from each other. Once image data for one sheet of the paper P is stored in each of the memory area, this image data is transferred to the information storage media unit 37 under the command from the CPU 27.

The information storage media unit 37 is an external storage device which writes image data into an optical disk, a flexible magnetic disk, magnetic tape or other storage media as a file. Each file may be assigned with a serial number in the order of creation, for the convenience of retrieval.

The display control unit 39 carries out the control required for the display of information for the purposes of checking the contents of the read-out data, and reproducing the image data written into the information storage media unit 37, and is provided with a display unit 57 such as a CRT unit connected thereto.

The time and date unit 41 is a calendar/timer, and produces data on the current date and time under the command from the CPU 27, and the data on the current date and time produced by the time and date unit 41 is automatically time stamped on each of the files as information on the date and time of creation when storing image data obtained by the read-out process into the information storage media unit 37 as a file.

Figure 3:
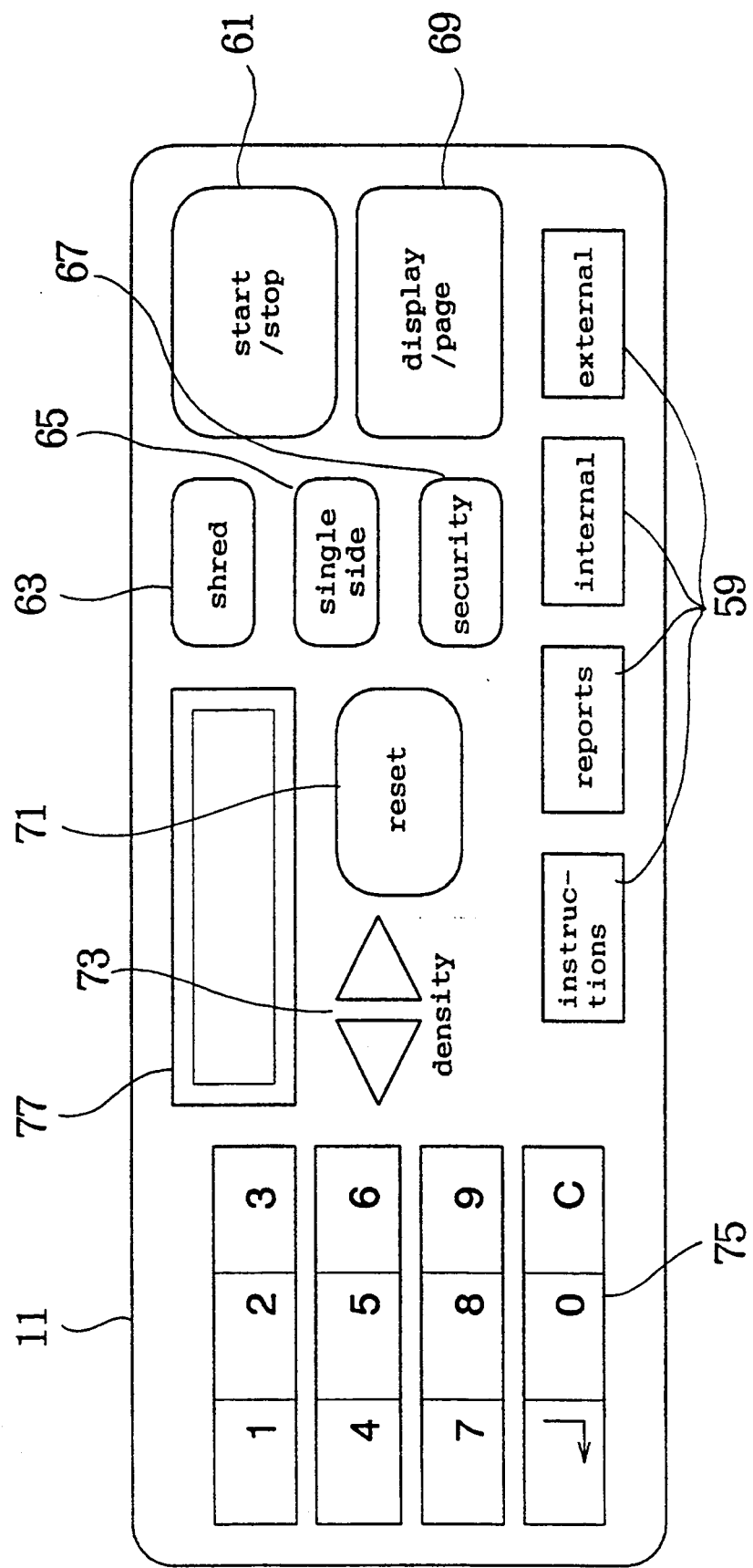
FIG. 3 is an embodiment of the operation panel of the disposal system for paper documents according to the present invention.

The information category data unit 43 stores different codes for different categories of documents which are expected to be created during normal course of work, such as "reports", "instructions", "internal materials" and "external materials"., and the operator can select each category by pressing one of category selection keys 59 provided in the operation panel 11 as illustrated in FIG. 3. The data on the selected category of documents is automatically attached to the file when storing the data read out from the paper sheet that is to be shredded along with the data on the date and time of creation.

Referring to FIG. 3, the operation panel 11 comprises, in addition to the category selection keys 59, a start/stop key 61, a shredding mode selection key 63, a single-side mode selection key 65, a security mode selection key 67, a display mode selection/next page key 69, a reset key 71 for resetting various conditions, a density adjustment key 73 for adjustment for different density of the paper sheet to be read out, a ten-key pad 75 for entering a password in case of a security mode and designating the file that is to be displayed, and an LCD panel 77 for displaying the set-up conditions, and the signals from these keys are supplied to the information processing unit 9.

Now the operation of the disposal device for paper documents according to the present invention is described in the following.

When the power is turned on, the double-side read-out mode is automatically set up by default, and a stack of paper documents that is to be disposed is placed on the paper feed table 13 of the automatic paper feeding unit 1 with is first page facing up on top of the stack. If necessary, one of the category selection keys 59 may be pressed according to the category of the documents that are to be disposed, and the start/stop key 61 is pressed.

This causes the paper P on the paper feed table 13 to be fed to the paper feed roller unit 3 sheet by sheet, and then fed into the information read-out unit 5 again sheer by sheer. At this time point, the front side CCD line sensor 19 and the back side CCD line sensor 21 are both ready for read-out, and the front side CCD line sensor 19 scans the information printed on the front side of the sheet of paper P passing in front of (below in FIG. 1) the CCD line sensor 19 at a prescribed speed, and the back side CCD line sensor 21 scans the information printed on the back side of the sheet of paper P passing in front of (above in FIG. 1) the CCD line sensor 21 at a prescribed speed. Thus, the two sides of the paper P are read by the device.

Referring to FIG. 2, the electric signal produced by the front side CCD line sensor 19 is amplified by the amplifier 49, and is converted into a digital signal by the A/D converter 51. Likewise, the electric signal produced by the back side CCD line sensor 21 is amplified by the amplifier 55, and is converted into a digital signal by the A/D converter 53. The digital signals thus obtained are supplied to the image processing unit 33 which carries out compensation and compression processes on these signals, and are stored in the image storage unit 35 for each sheet of the paper P.

After the image data of the front side of the paper and the image data of the back side of the paper are stored in the corresponding memory areas of the image storage unit 35, the image data on the front and back sides of the paper P is transferred to the information storage media unit 37 in a prescribed order, and written into the memory medium.

When there is no information printed on the front and back sides of the paper sheet P, and the read-out image data is totally blank, there is no need to transfer the image data of this particular sheet, and this finding is transferred to the information storage media unit 37 to be recorded as such in the information storage media unit 37.

The writing of the image data into the recording medium of the information storage media unit 37 is carried out so that a single unit of documents are handled as a single file which is accompanied by data on the date and time of creation generated by the date and time unit 41, and the document category data generated by the category data unit 43 so that this data may be written into the recording medium of the information storage media unit 37 along with the image data, and may be read out as desired.

After being passed through the information read out unit 5 and read out thereby, the paper P is fed into the paper shredding unit 7, and is shredded finely enough to be illegible and dropped into the shredded paper storage box 25.

When a security measure is required in discarding the shredded paper, the security mode selection key 67 is pressed before the start/stop key 61 is pressed. In this case, a security mode is set up, and a password is prompted to be entered. When the necessary password is entered as an entry of a plurality of digits from the ten-key pad 75, the read-out process may be started by pressing the start/stop key 61.

When only one side or the front side of the paper P is required to be read, the single-side mode selection key 65 is pressed before the start/stop key 61 is pressed, and only the front side CCD line sensor 19 is activated for the read-out process. Alternatively, it is possible to activate only the back side CCD line sensor 21 when the single-side mode is selected.

When the information printed in the paper P is not required to be stored, the shredding mode selection key 63 is pressed before the start/stop key 61 is pressed. In this case, both the front side CCD line sensor 19 and the back side CCD line sensor 21 are both deactivated, and the paper P is simply fed into the paper shredding unit 7 without reading the information printed on the paper.

When the image data stored in the storage medium of the information storage media unit 37 for each document as a file is to be reproduced, the display mode selection/next page key 69 is pressed. This sets up the display mode for the image data, and a list of the files stored in the storage medium of the information storage media unit 37 is displayed on the display unit 57 as illustrated in FIG. 4. This list contains only those files which are not assigned with a password for security purpose. To list those assigned with a password, it is necessary to press the security mode selection key 67 and to enter the password from the ten-key pad 75. In this case, if the entered password matches up with the password assigned to the file, the list of the files associated with this password is displayed on the display unit 57.

This file list contains the serial number, the date and time of creation, the category and the number of pages for each file, and the file to be displayed may be selected by entering the desired serial number from the ten-key pad 75.

When the file to be reproduced is selected by entering the corresponding serial number of the file, the designated file is read out from the storage medium of the information storage media unit 37 so that it may be displayed page by page. If the image data consists of double-side information, the image data may be displayed simultaneous on the display unit in two split windows, or sequentially one by one.

Figure 5:
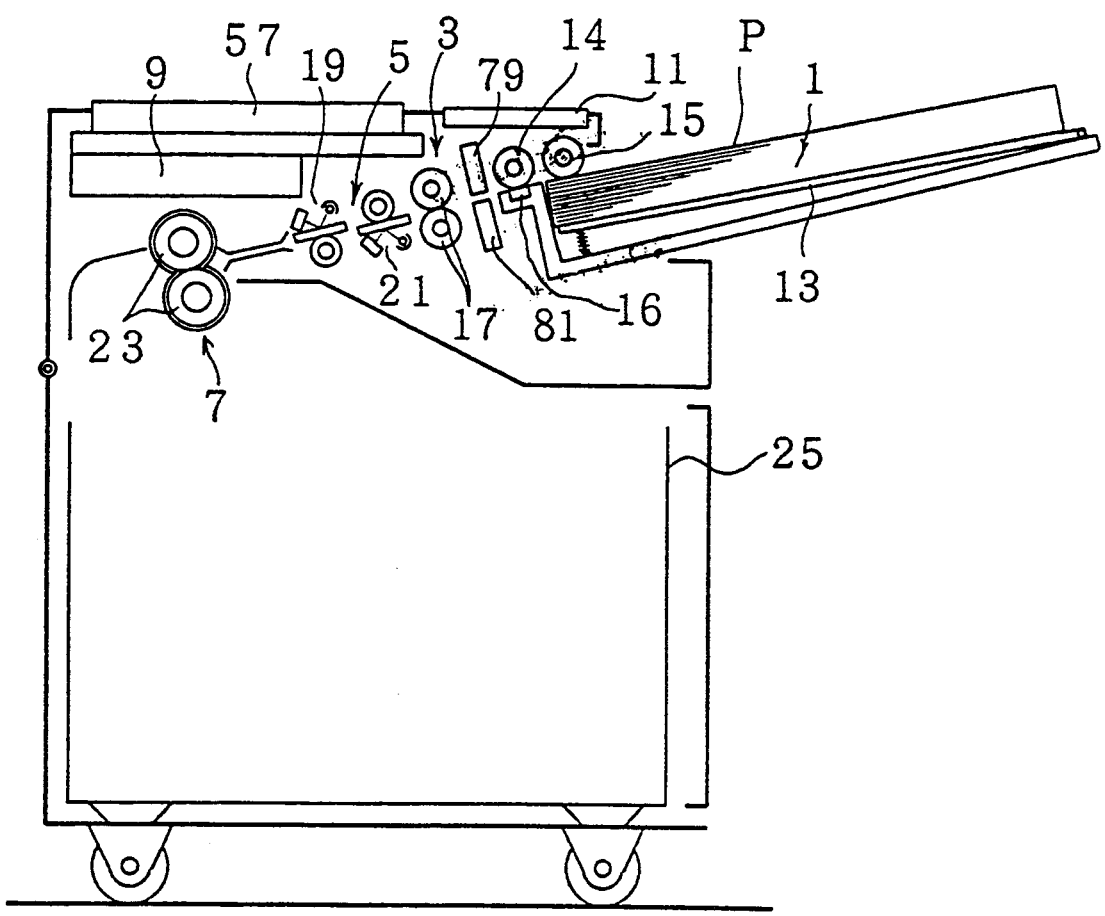
FIG. 5 is a view similar to FIG. 1 showing another embodiment of the present invention.

FIG. 5 shows another embodiment of the disposal device for paper documents. In FIG. 5, like parts to those of FIG. 1 are denoted with like numerals.

Referring to FIG. 5, a Raper separating roller 14 and a friction pad member 16 are arranged opposite to each other at an inlet end of the automatic paper feeding unit 1, and even when two sheets of the paper P are fed from the paper feed table 13, only the upper sheet may be fed out by preventing the feeding of the lower sheet by making use of the difference of the friction between the paper separation roller 14 and the paper sheet P from that between the friction pad member 16 and the paper sheet.

A light emitting element 79 and a light receiving element 81 are placed opposite to each other at a laterally central part of the inlet end of the automatic paper feeding unit 1 on upper and lower sides of the path for feeding paper P, and the passage of each sheet of paper, the count of the number of the paper sheets that have been fed, and the occurrence of double feed can be detected according to the change in the amount of light received by the light receiving element 81 for each of the paper sheets passing between the light emitting element 79 and the light receiving element 81, and obstructing the transmission of light therebetween.

Detection of a faulty double feeding of the paper or detection of the occurrence of feeding two sheets of paper at a time may be accomplished by detecting the changes in the amount of light passed through a single sheet of paper and two sheets of paper, and a detection circuit for the light receiving element 81 stores a threshold level which corresponds to the amount of light that is passed through a single sheet of paper so that the occurrence of double feeding of the paper may be detected by the reduction of the light received by the light receiving element 81 below the threshold level. When a double feeding of paper is detected, the feeding of the paper P is interrupted, and an error display and an alarm are activated as an error process.

Figure 6:
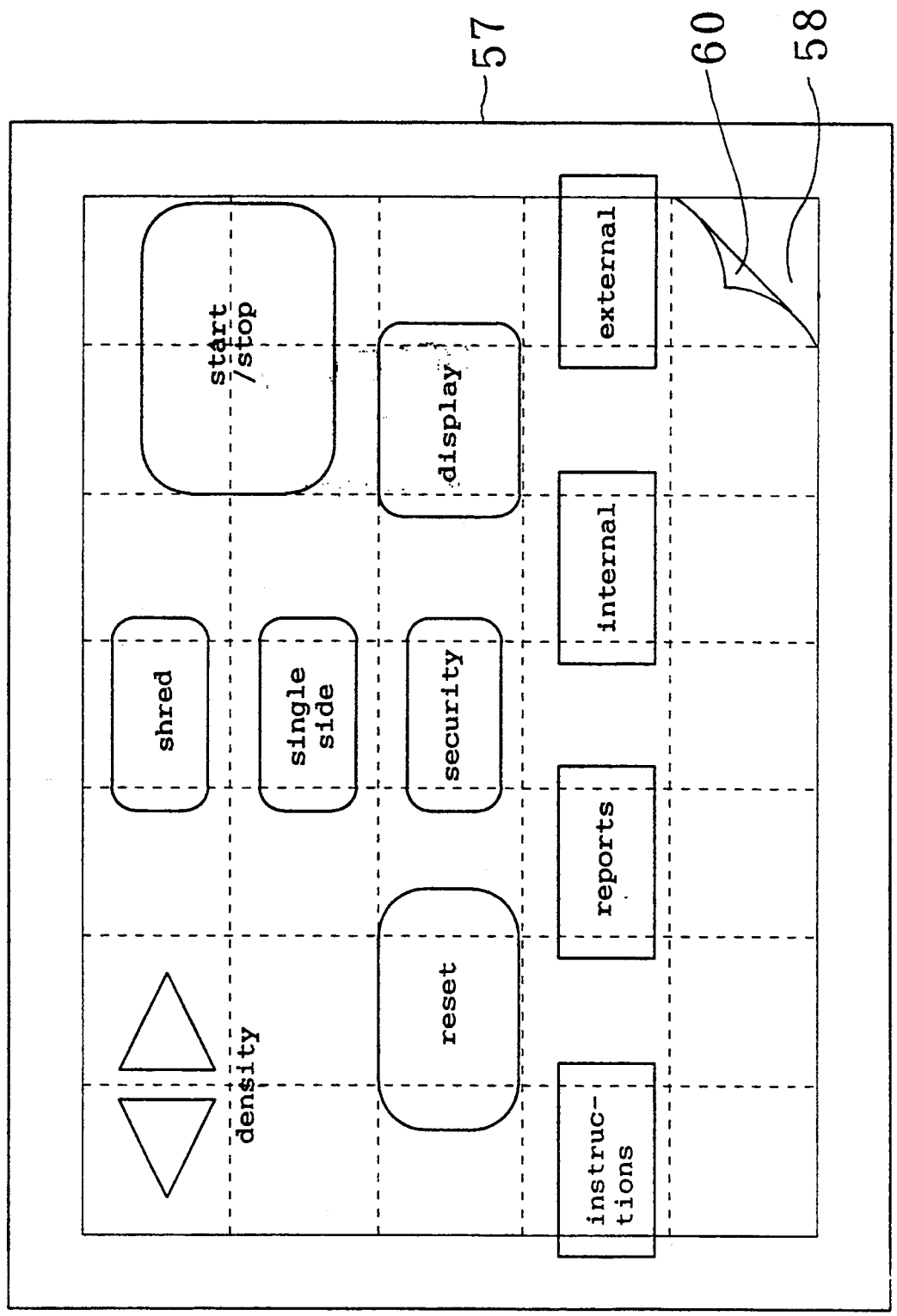
FIG. 6 is a plan view showing an example of the display unit of the disposal system for paper documents according to the present invention.

In the embodiment illustrated in FIG. 5, a display unit 57 is mounted integrally on the upper surface of the cabinet of the disposal device for paper documents. As illustrated in FIG. 6, the display unit 57 consists of an LCD panel 58 on which a transparent touch panel 60 is overlaid. According to this embodiment, as illustrated in FIG. 6, various keys are displayed on the LCD panel 58, and various modes, functions and items can be selected by pressing the parts of the touch panel 60 which are indicated as being such keys by the LCD panel 58. In this case, the operation panel 11 may be omitted.

Figure 7:
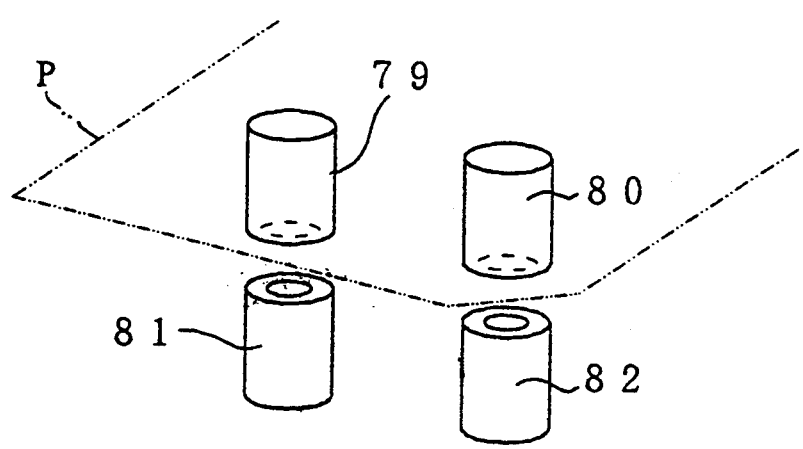
FIG. 7 is a plan view of an essential part of yet another embodiment of the present invention.

FIG. 7 shows an essential part of yet another embodiment of the disposal device for paper documents. In this embodiment, on one side of the light emitting element 79 and the light receiving element 81 is disposed another pair of light emitting element 80 and light receiving element 82 which face the path for feeding paper from above and below, respectively. The light emitting and receiving elements 80 and 82 are so positioned as to oppose a side edge of the paper sheet which is being fed and to allow the light emitted from the light emitting element 80 to reach the light receiving element 82 when a corner of the forward edge of the paper sheet is cut off in a triangular shape without being interrupted by the paper sheet P.

Therefore, according to the combination of the amounts of light received by the two light receiving elements 80 and 81, it is possible to detect whether a corner of the forward edge of the paper sheet is cut off in a triangular shape or not. Thereby, it is possible to pick out certain pages of the document consisting Of a plurality of sheets of paper stacked on the paper feed table 13, and to automatically read and store information from these pages of the documents by activating the information read out unit 5 only when such special pages are being fed.

Such selective reading of information can be accomplished by suitably marking a certain position of each sheet of paper, and activating the information read out unit 5 to read information from each paper sheet only when such a marking is detected on the paper sheet.

Figure 8:
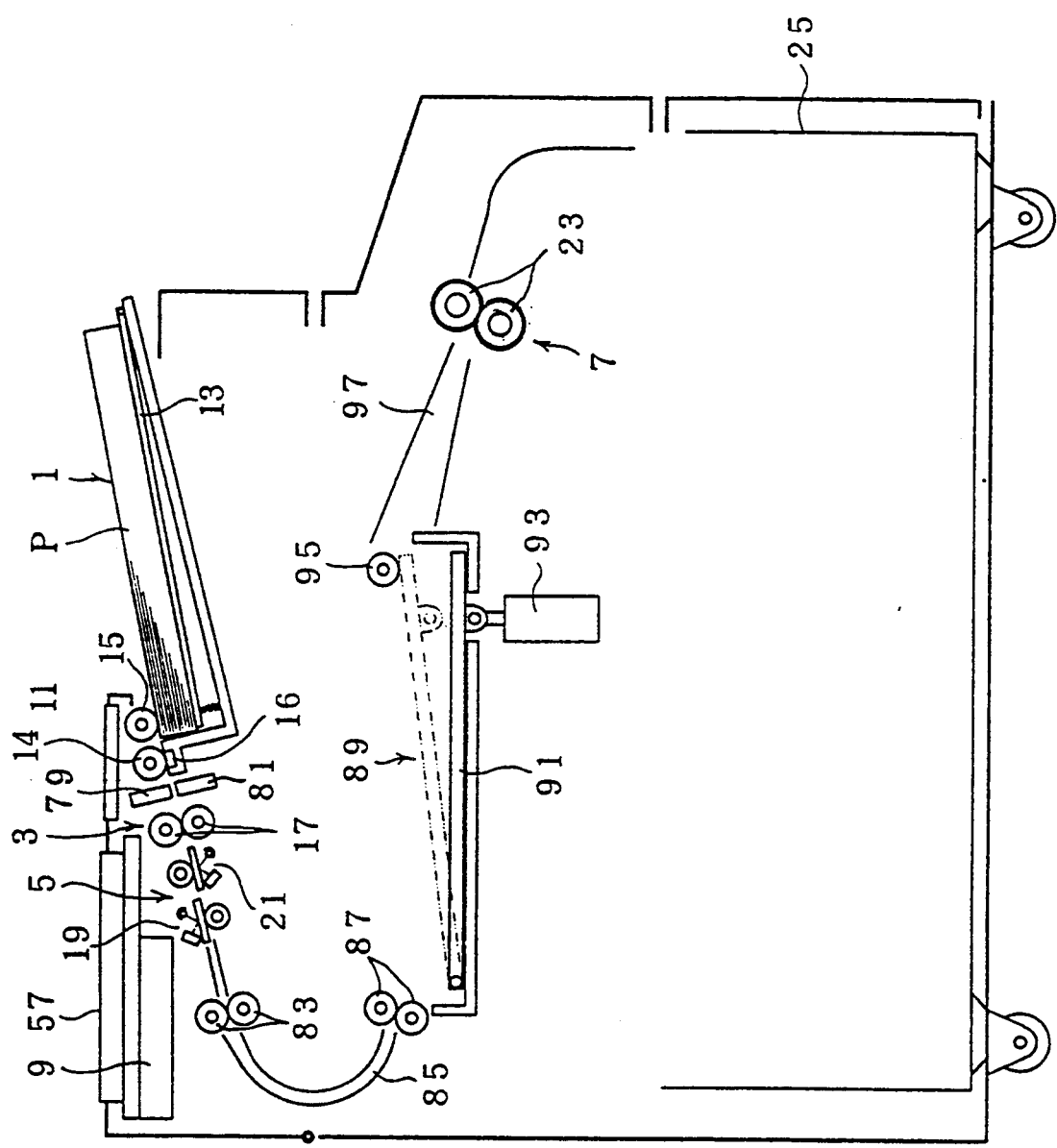
FIG. 8 is a view similar to FIG. 1 showing yet another embodiment of the present invention.

FIG. 8 shows yet another embodiment of the present invention. In FIG. 8, like parts to those of FIGS. 1 and 5 are denoted with like numerals.

In this embodiment, the disposal device for paper documents incorporates a paper storage unit 89 as well as a pair of rollers 83, a paper guide passage 85, and a pair of paper feed rollers 87 for feeding paper sheets P from the information read out unit 5 to the paper storage unit 89. The paper storage unit 89 comprises a movable paper receiving table 91, an actuator 93 for drivingly tilting the paper receiving table 91, and a paper feed out roller 95, and the paper sheets which have passed through the information read out unit are stacked on the paper receiving table 91 which is placed in a lower position as illustrated by solid lines in FIG. 9.

The paper receiving table 91 is brought down to the lower position by the actuator 93 for receiving the paper P and is lifted up to an upper position by the actuator 93 for pushing the paper P on the paper receiving table 91 against the paper feed out roller 95 to feed out the paper sheets P as indicated by the imaginary line in the drawing.

The paper feed roller 95 feeds out the paper P pushed against it toward the paper feed guide passage 97, then to the paper shredding unit 7. The feeding of the paper P to the paper shredding unit 7 by the paper feed out roller 95 may not be necessarily carried out sheet by sheet, but may be carried out for a number of sheets at a time depending on the paper shredding capability of the paper shredding unit 7.

The feeding of the paper P from the paper storage unit 89 to the paper shredding unit 7 may be carried out by pushing an accept key provided in the operation panel 11 or by touching an area of the touch panel 58 in which an accept key is displayed on the LCD panel 58 of the display unit 57. However, this operation is carried out only when the number of sheets of the paper P on the paper feed table 13 which has been checked in advance and the count of the number of sheets of paper that have been read and displayed on the display panel 77 of the operation panel 11 or the display unit 57 agree with each other. Otherwise, feeding of the paper P from the paper storage unit 89 to the paper shredding unit 7 is interrupted, and paper P is taken out from the paper storage unit 89 and returned to the paper feed table 13 as required.

Such a checking process may also be carried out automatically by entering a pre-set number of sheets of paper P on the paper feed table 13 in the information processing unit 9 in advance prior to starting the read out of the paper, and comparing the number of sheets of paper set on the information processing unit 9 with the number of sheets of paper which are automatically counted.

Figure 9:
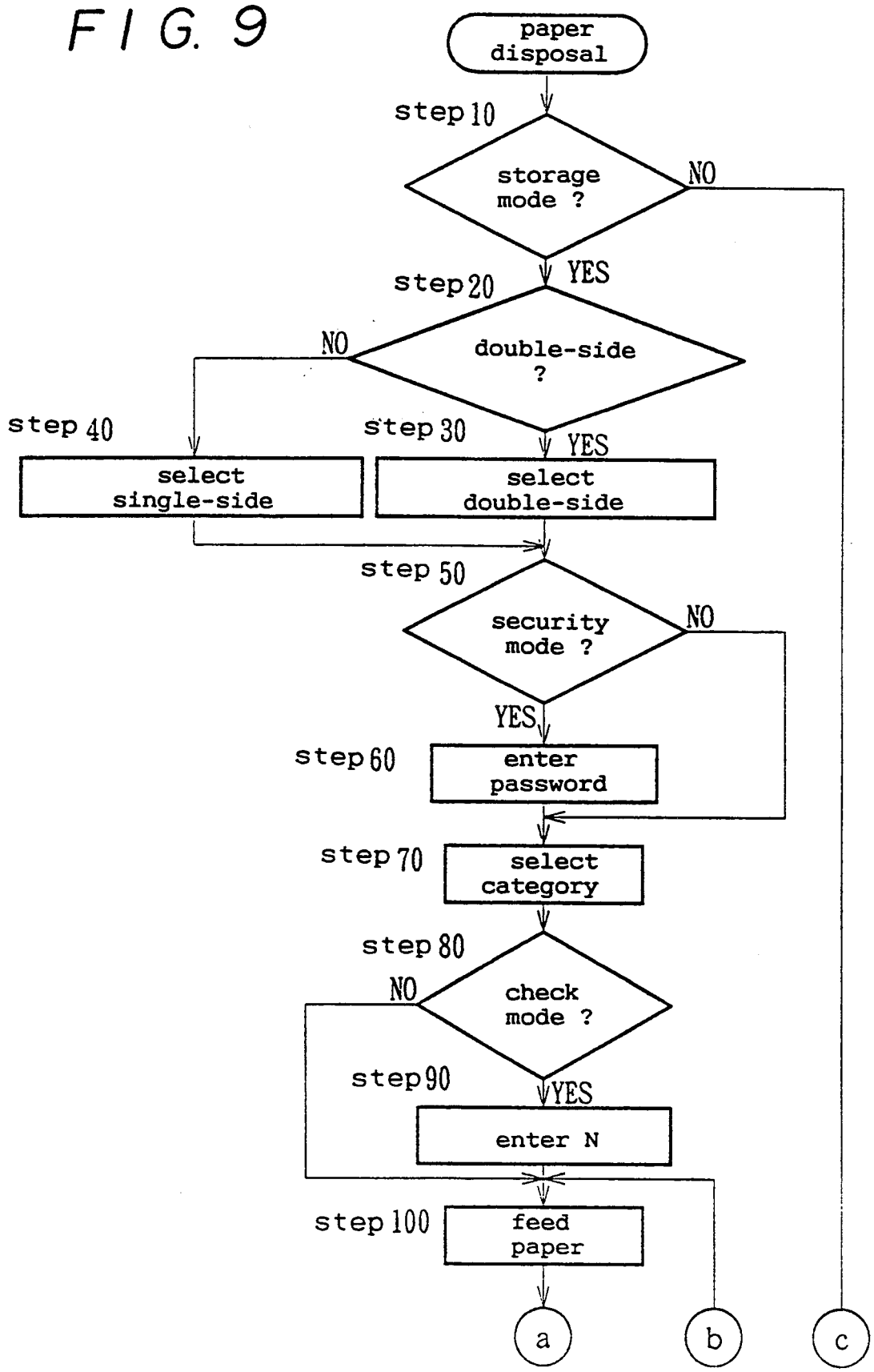
FIG. 9 is a flow chart showing steps 10 through step 100 of the control flow of the embodiment illustrated in FIG. 8.

FIGS. 9 and 10 show an example of control flow of the disposal device for paper documents equipped with such an automatic checking mode. In this control flow, first of all, it is determined if the current mode is either a storage mode or a shredding mode (step 10). In case of the shredding mode, as there is no need to read information, shredding of the paper document P by the paper shredding unit 7 is immediately started (step 180).

In case of the storage mode, it is determined whether the double-side read out mode or the single-side read out mode (step 20) is selected. In the case of the double-side read out mode, the double-side read out mode is set up by activating both the front side CCD line sensor 19 and the back side CCD line sensor 21 (step 30). In the case of the single-side read out mode, the single-side read out mode is set up by activating only the front side CCD line sensor 19 (step 40).

It is then determined if the security mode has been selected (step 50), and, if so, the program flow advances to the step of entering a password (step 60) which is followed by the step of entering an information category (step 70). If the security mode has not been selected, the program flow advances directly to the step of entering an information category (step 70).

Thereafter, it is determined whether the checking mode has been selected and, if so, the number N of sheets of paper P on the paper feed table 13 is inputted (step 90).

When the steps of mode selection are completed, the paper feed action is started (step 100), and the paper P is fed into the information read out unit 5 sheet by sheet while watching for any double paper feed according to the change in the amount of light received by the light receiving element 81 (steps 110 and 120).

When a double paper feed is detected, an error process is carried out and feeding of the paper is interrupted (step 190). If there is no double paper feed, the number n of sheets of paper is counted up by one (step 130), and information is read out from the paper sheet P in the information read out unit 5.

It is determined whether feeding of all the paper P on the paper feed table 13 has been completed or not (step 150), and if there is any paper left on the paper feed table 13 the next paper sheet is fed out (step 100). On the other hand, if all the paper on the paper feed table 13 has been fed out, it is determined whether the check mode has been selected (step 160).

If the check mode has not been selected, the paper in the paper storage unit 89 is immediately conveyed to the paper shredding unit 7 which shred the paper into small pieces (step 180). On the other hand, if the check mode has been selected, it is determined whether the count of the number n of sheets of paper P agrees with the set count of the number N of sheets of paper P or not (step 170).

If the counted number n of sheets of paper P agrees with the set number N, it means that all the paper set on the paper feed table 13 has been fed out sheet by sheet without any double paper feed. In other words, it means that all of the information printed on the paper set on the paper feed table 13 has been read out. Therefore, the feeding out action of the paper storage unit 89 is started, and the paper P in the paper storage unit 89 is fed to the paper shredding unit 7 which shred the paper 7 into small pieces (step 180).

If the count of the number n of sheets of paper P that have been read does not agree with the set number N of sheets of paper P, in particular, if n<N, means that there was double paper feed, and an error process is carried out in which the paper feeding action from the paper storage unit 89 to the paper shredding unit 7 is prohibited (step 190). Thus, prohibiting the shredding and destroying of paper P from which information has not been read out.

The count of the number of sheets of paper n which have been read is reset to zero in the final step (step 200).

In any one of the above described embodiments, the reproduction of the image data stored in the storage medium of the information storage media unit 37 may be, in addition to being displayed on the display unit, taken out from the disposal device, and transferred to a floppy disk driver or an optical disk driver of a personal computer, an electronic filing system or other information processing device so that the image data stored in the storage medium may be read out with the personal computer or the electronic filing system, and displayed and printed out from the personal computer or the electronic filing system as required. Also, the disposal device may be linked with personal computers and electronic filing systems so that on-line communication may be made therebetween, and the image data may be displayed and printed out from the personal computers and the electronic filing systems as required.

The disposal device for paper documents according to the present invention may consist of two separate units, one containing the automatic paper feed unit 1 and the information read out unit 5 and the other containing the paper shredding unit 7 as indicated by A and B in FIG. 11. In this case, once the unit A containing the paper feed unit 1 and the information read out unit 5 is removed from the unit B containing the paper shredding unit 7, the unit B may simply consist of a conventional paper shredder, and may also be used as a normal paper shredder. The unit B may also consist of an existing paper shredder, and it may be converted into a disposal device for paper documents according to the present invention simply by mounting the unit A as described above on the existing paper shredder.

In the above described embodiments, CCD line sensors were used as means for information read out, but the present invention is not limited to the use of such CCD sensors but may use contact-type CCD sensors or other optical reader systems.

As described above, in the disposal device for paper documents according to the present invention, since the information printed on the front side of paper can be read out with a front side read out unit while the information printed on the back side of the paper can be read out with a back side read out unit so that the information from the two sides of the paper may be stored in information storage means and reproduced from the storage means as required, all the information printed or otherwise recorded on either side of the paper can be safely stored in memory and retrieved as required without requiring any cumbersome efforts.

Further, since the provision of the paper storage means allows the paper from which information is read out with the information read out unit to be temporarily stored, and shredded only after it is confirmed that the information has been truly read out, it is possible to eliminate the possibility of destroying documents before storing the information carried by them, and an extremely high reliability can be achieved.

Although the present invention has been described in terms of preferred embodiments thereof, it is obvious to a person skilled in the art that various alterations and modifications are possible without departing from the scope of the present invention which is set forth in the appended claims.

What we claim is:

1. A device for disposing paper and other information carrying media, comprising:

means for reading information printed on each sheet of paper, said information reading means comprising a first information reading means for reading information from one side of each sheet of paper, and second information reading means for reading information from the other side of each sheet of paper;

information storage means for storing information read by said information reading means; and paper shredding means for shredding said paper sheet from which said information has been read by said information reading means.

2. A disposal device according to claim 1, further comprising means for storing paper sheets before shredding by said shredding means after information has been read therefrom by said information reading means; and means for feeding said paper sheets from said meand for storing paper sheets to said paper shredding means only after the process of reading information from said paper sheets by said information reading means has been satisfactorily completed.

3. A device for disposing paper and other information carrying media, comprising:

means for reading information printed on each sheet of paper;

information storage means for storing information read by said information reading means;

paper shredding means for shredding said paper sheet from which said information has been read by said information reading means;

means for storing paper sheets before shredding by said shredding means and after information has been read therefrom by said information reading means; and means for feeding said paper sheets from said means for storing paper sheets to said paper shredding means only after the process of reading information from said paper sheets by said information reading means has been satisfactorily completed.

* * * * *